United States Patent [19]
Novak

[11] 3,810,394
[45] May 14, 1974

[54] CENTRIFUGAL MECHANICAL DEVICE
[76] Inventor: Leo J. Novak, 2941 S. Dayton Lakeview Rd., New Carlisle, Ohio 45344
[22] Filed: Dec. 1, 1972
[21] Appl. No.: 311,116

[52] U.S. Cl. .................................. 74/87, 74/84 S
[51] Int. Cl. ............................................ F16h 33/10
[58] Field of Search ..................... 74/84 S, 61, 87

[56] References Cited
UNITED STATES PATENTS
3,505,886  4/1970  Hill et al. ............................... 74/61

2,862,393  12/1958  Bakker .................................... 74/61

FOREIGN PATENTS OR APPLICATIONS
933,483  1/1948  France .................................. 74/84 S
573,912  3/1958  Italy ..................................... 74/84 S Primary Examiner—Allan D. Herrmann

[57] ABSTRACT

A machine for producing directable centrifugal force or thrust utilizing a series of off center rotating masses such that there is a total excess torque component of centrifugal thrust exerted in a predetermined direction over that produced in a direction opposite thereto.

6 Claims, 3 Drawing Figures

PATENTED MAY 14 1974

3,810,394

CENTRIFUGAL MECHANICAL DEVICE

THE INVENTION

The present invention relates to a machine or centrifugal device for developing a thrust or torque which exceeds in magnitude that produced by moving bodies in the form of rotating masses employed to produce it.

Centrifugal force or thrust has not been used heretofore to produce directed motion in a predetermined direction. A mass rotating about a central axis under constant length radii which produces a centrifugal force greater than its weight does so equally in all directions of its plane of rotation. This follows, because (1) torque is applied from a centered revolving axis, (2) the path of the rotating body or mass is circular, (3) the angular rotational velocity is uniform, and (4) the length of the radius connecting the axis of revolution to the rotating body is constant per revolution, and (5) the plane of circular motion for the body or mass is not displaced or shifted.

The centrifugal force (calculated in dynes/lb.) produced by a body, for example, weighing 1,000 grams and rotating at 600 rpm in a plane, will produce a force equal to 8.87 times the radius ($r$) in pounds (lbs.). Where the radius ($r$) is 20 centimeters (cm) the force produced is 177.4 lbs. If the radius ($r$) is reduced to 10 cm, the force produced is 88.7 lbs. Thus, as will be seen, if the length of ($r$) is increased in the desired direction of centrifugal thrust and then decreased in the opposite direction during rotation, an excess of force or thrust will be attained. This excess centrifugal force is exerted in the direction of increased radii. A greater excess force is produced by increasing the mass weight, and/or increasing the r.p.m. and the length of the radii ($r$) in the desired thrust direction at the expense of the length of radii ($r$) in the opposite direction.

In accordance with this invention, the length of the radius connected to the rotating mass or body, which is centrifugally driven by a power source, is varied by sliding the radius member through a revolving axis of rotation, the axis being off centered with respect to the rotating mass. Thus by having a series of off centered rotating masses laterally separated from each other and by predetermined angles between them at a particular instant of time but in separate planes of rotation, the rotating masses produce a summation of directed thrust or torque in the desired direction.

The principal object of the present invention is to provide a machine or device operating as a variable radii centrifugal mechanism to produce torque or thrust in a prechosen direction. The invention is useful for producing ocillation or vibratory movement, for example, such as required for actuating agitators, shakers and the like equipment. A continuous directed thrust is attained by the use of interconnected centrifugal units.

The accompanying drawings illustrate a suitable machine for utilizing the invention. It is understood, however, that this invention is not limited to the precise arrangements and instrumentalities shown, and other objects and advantages of the invention will be apparent from the following description, drawings and appended claims.

Figure 1:
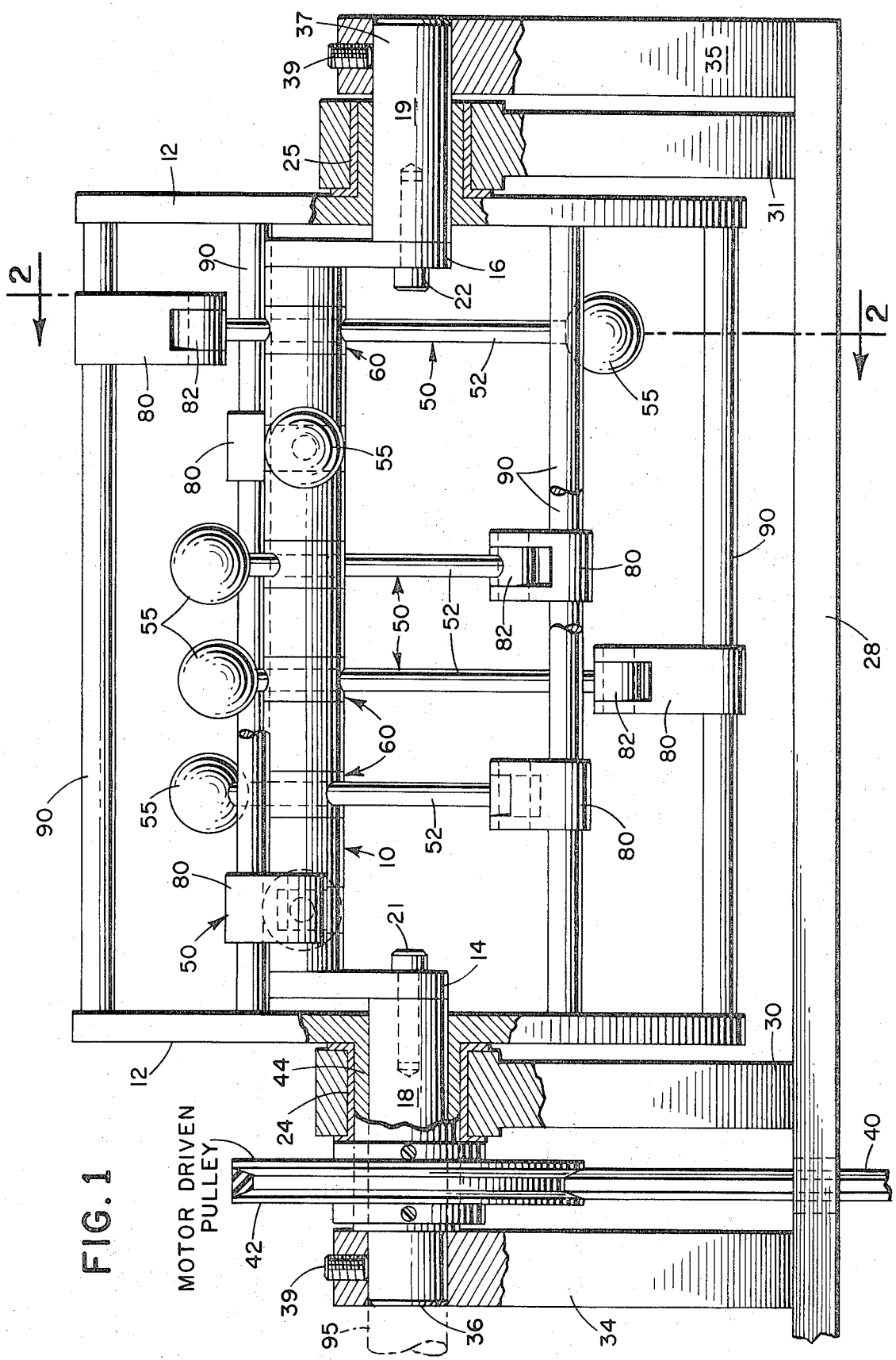
FIG. 1 is a side elevation, partly in section, of a single unit centrifugal machine operable in accordance with this invention.

In the figures an off center of rotation axis shaft 10, hereinafter referred to as OCAR shaft, is fixedly mounted and operatively coupled as shown in FIG. 1, to a rotatable drive wheel 12. The OCAR shaft 10 comprises crank arms 14 and 16 at opposite ends of the shaft. The inner ends of the crank arms 14 and 16 are securred to non-rotatable shafts 18 and 19, respectively, by stud bolts 21 and 22, as shown in FIG. 1. Where it is desired to change the directed excess thrust force, bolts 21 and 22 are removed and the OCAR shaft 10 moved or shifted to a new position and then again fixedly secured to the non-rotatable shafts 18 and 19 by the stud bolts 21 and 22.

Figure 2:
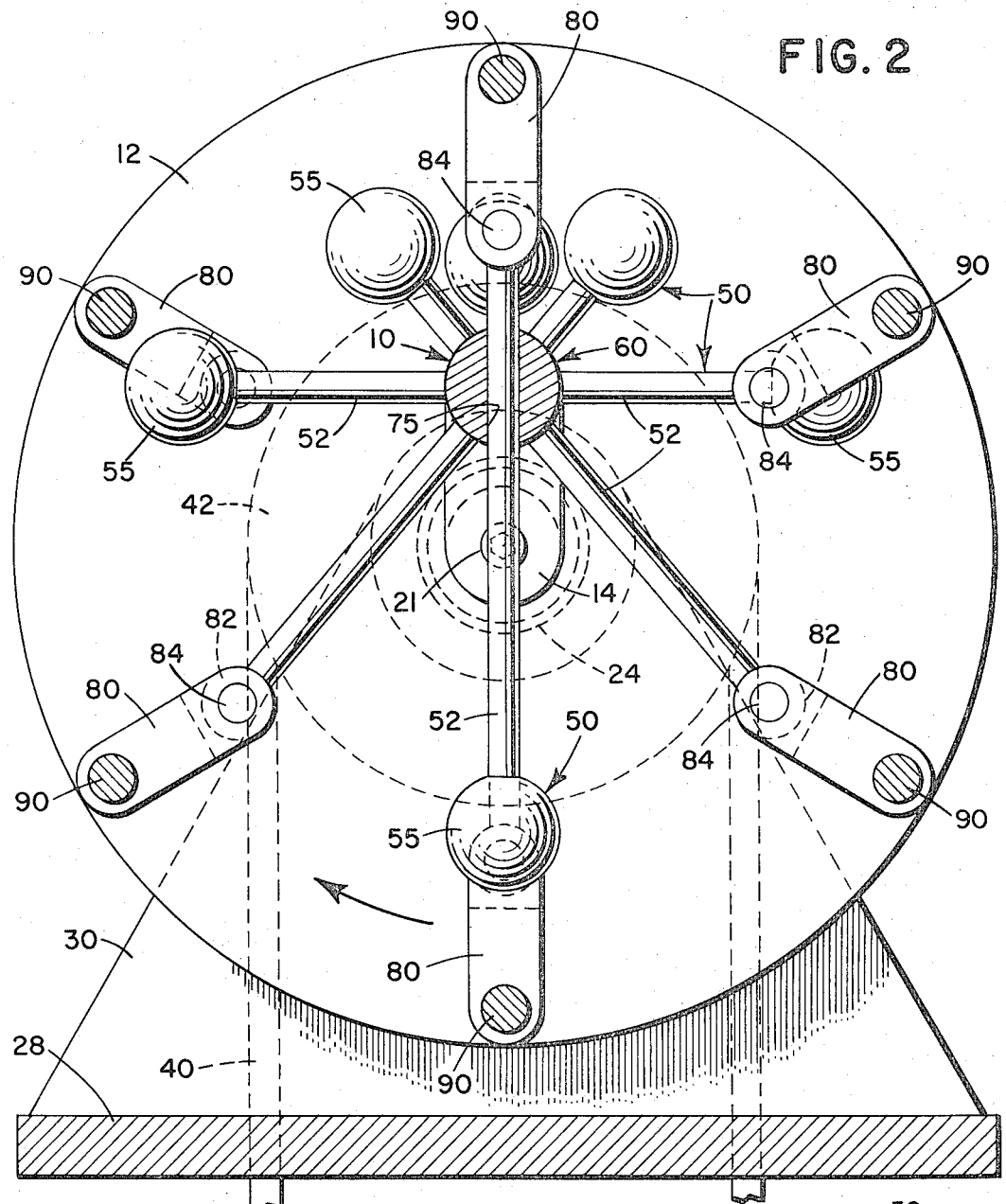
FIG. 2 is a section through the machine taken along the line of 2—2 of FIG. 1.

As will be seen in FIGS. 1 and 2, the revolvable member or wheel 12 is suitably mounted for rotation on bearing members 24 and 25 which are in turn mounted on a machine base plate 28 by bearing support members 30 and 31. Outer end members 34 and 35 secured to the base plate 28 provide additional supports for the opposite hub sections of the drive wheel 12, and arranged to form supports for extended shaft portions 36 and 37 of the non-rotatable shafts 18 and 19 respectively. Supports 34 and 35 are suitably secured at their upper ends to the shaft portions by set screws 39, as shown in FIG. 1.

Power is transmitted to the drive wheel 12 through a V-belt 40 by a grooved pulley 42, the pulley being fixed onto a power drive tube 44 secured to the wheel member 12 as illustrated in FIG. 1.

The OCAR shaft 10 is made up of a series of centrifugal units 50, six being illustrated, which units are spaced laterally along the shaft 10 as shown in FIG. 1. Each unit comprises a slidable radius rod 52 supported for reciprocation by the shaft 10, and carrying on its outer end a solid body or mass 55, the latter being of any suitable shape, size and material e.g. metal, ceramic or wood in the form of a ball or block. Each of the radii rods 52 to which the mass 55 is attached is arranged to slide independently back-and-forth in its own bearing assembly, as generally indicated at 60, on the OCAR shaft 10.

Figure 3:
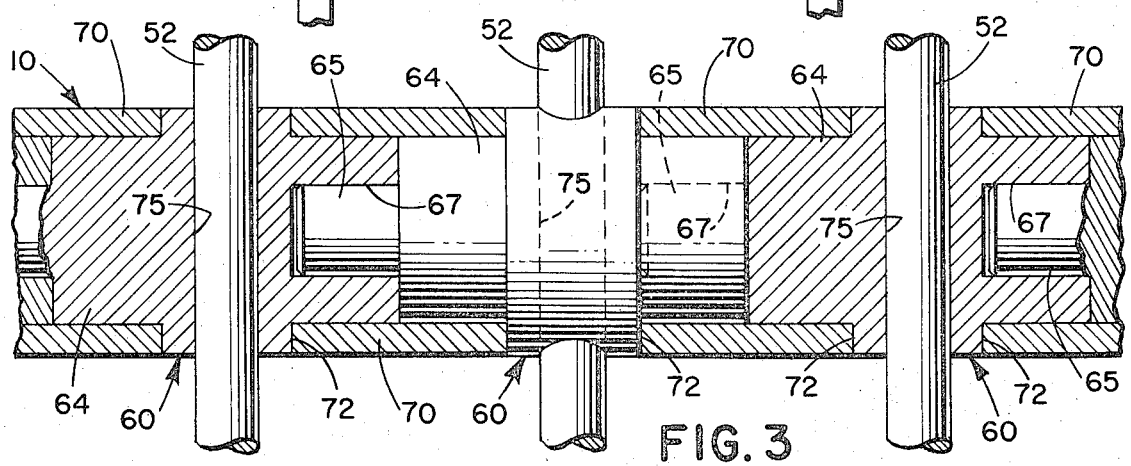
FIG. 3 is a fragmentary detail section view taken through the off center axis shaft and showing the radii slide rod structure connected thereto.

The radii slide bearing assemblies 60 are preferably constructed as illustrated in FIG. 3, and comprise an inner cylinder 64 and a centrally placed round spindle 65 with a central aperture 67 at the other side. The spindle of one unit is arranged to fit into the aperature of the adjacent unit so that a universal jointure and bearing means is provided for each slidable radii unit. Surrounding the junction of the cylinders 64 and spindle 65 is a close fitting sleeve 70 which extends equidistant in both lateral directions from the rotating junction of 64 and 65 and abuts against collars 72 of the units as shown in FIG. 3. This sleeve member 70 prevents wobbling or misalignment of the parts during operation of the machine. Centrally and perpendicularly to the horizontal axis of the cylinder unit 64 is provided a hole 75 through which the radii rods 52 slide.

The opposite ends of each of the radii rods 52 from the masses 55, as shown in FIG. 2, are adapted to receive a drive wheel extender connector member 80. This extender connector 80 comprises a bearing 82 for rotatably mounting therein shaft 84 of the radii rod 52.

The bearing means 82 permits the radii rods 52, attached thereto, to change their angular relationship with respect to the extenders 80, the bearing end being positioned to permit a limited angular rotation or shift so that the machine will operate smoothly in all positions during rotation of the drive wheel 12. As will be seen in FIG. 1, the other end of the drive wheel extendors 80 are slid onto drive wheel shafts 90 and positioned thereto as by a set screw or welding (not shown).

Where it is desired to couple together two centrifugal units, such as illustrated in FIG. 1, the second centrifugal unit is directly connected thereto through shaft 18 as indicated at 95 in FIG. 1. Two or more units may be utilized depending upon the thrust force or torque desired. Further, the numbers of radii-sliding units 60 may be increased or decreased as desired so long as the centrifugal machine operates to provide a directed force or thrust. At slow rpm speeds of wheel rotation there is obviously less driving power required and uniform rotational speed may not be attained, however, where enough torque power is applied the rotational speed will equilibrate to uniformity.

By adjustment of the OCAR shaft's position, as heretofore described, it permits the rotating pathway of the masses (e.g. 55) to be controlled. For instance, the pathway of the centrifugally moving masses may be oval, elliptical, limacon or cardiodal depending upon the position of the OCAR shaft. The object of invention, as explained, is to develop an excess or greater, and useful, centrifugal force from such rotating masses and which force may be directed in a predetermined direction.

While preferred embodiments of this invention have been herein illustrated and described, it is to be understood that various changes may be made therein without departing from the scope and spirit of the invention, and further it is intended to claim the invention broadly as defined in the appended claims.

What is claimed is:

1. A centrifugal machine for producing excess thrust or torque in a predetermined direction comprising at least one unit which includes a revolvable member, a fixed non-rotatable means containing rotatable components operatively connected to said revolvable member, said fixed non-rotatable means with rotatable components having its principal axis off center relative to the axis of said revolvable member; a mass attached to said revolvable member for swinging thereabout, a slidable member comprising a radius rod attached to said mass and to said revolvable member, said slidable member being carried by said rotatable components of said fixed non-rotatable means for varying the distance of said mass from the axis of the fixed non-rotatable means containing rotatable components during rotation of said revolvable member, and means for rotating said revolvable member.

2. A machine as set out in claim 1 wherein the revolvable member consists of a wheel, and the fixed non-rotatable means with rotatable components comprising an elongated shaft adjustably mounted within said wheel.

3. A machine as set out in claim 1 wherein said radius rod is slidably mounted for reciprocation while supported by said fixed non-rotatable means having rotatable components.

4. A machine as set out in claim 1 wherein said mass attached to the revolvable member comprises a plurality of bodies each secured to a slidable member supported by said fixed non-rotatable means containing rotatable components.

5. A machine as set out in claim 1 wherein the machine comprises a plurality of said units which are operatively connected to produce directable thrust or torque.

6. A machine as set out in claim 1 wherein said radius rod is rotatably coupled to extender connector means of said revolvable member to permit a limited angular movement of said radius rod during operation of the machine.

* * * * *